United States Patent [19]
Huber et al.

[11] Patent Number: 5,778,518
[45] Date of Patent: Jul. 14, 1998

[54] DEVICE FOR PRESSING SLOT SEALING PIECES FOR WINDING BARS INTO SLOTS OF AN IRON BODY OF AN ELECTRIC MACHINE

[75] Inventors: Albert Huber, Möriken; Armin Kech, Oberrohrdorf; Albert Kopp, Windisch; Rainer Spielmann, Birrhard, all of Switzerland

[73] Assignee: Asea Brown Boveri AG, Baden, Switzerland

[21] Appl. No.: 633,111

[22] Filed: Apr. 16, 1996

[30] Foreign Application Priority Data

Jun. 8, 1995 [DE] Germany ............... 195 20 868.4

[51] Int. Cl.⁶ ........................................ B23P 19/00
[52] U.S. Cl. .................. 29/736; 29/734; 29/596; 29/598; 29/252
[58] Field of Search .............. 29/734, 736, 596, 29/598, 252, 720, 281.1, 281.4; 269/17, 25, 11, 329, 307

[56] References Cited

U.S. PATENT DOCUMENTS 1,271,365  7/1918  Reynolds .................... 269/25
2,695,015  11/1954  Cooper ....................... 269/17

FOREIGN PATENT DOCUMENTS 31 961      10/1964  Germany.
6-120694    4/1994   Japan ........................ 29/720
525 581     8/1972   Switzerland.

Primary Examiner—Timothy V. Eley
Assistant Examiner—Benjamin M. Halpern
Attorney, Agent, or Firm—Burns, Doane, Swecker & Mathis, L.L.P.

[57] ABSTRACT

In a device (1) for pressing in slot sealing pieces (12, 14) for winding bars (20) inserted into the slots of a stator laminated core of an electric machine, a plunger (8) is arranged by means of a force-generating device (4) in a collet (2) with a cam (3). The plunger (8) and the cam (3) are situated opposite one another and move toward one another in the fashion of a screw clamp during operation of the force-generating device (4). In this arrangement, when slot sealing pieces are pressed in the cam (3) engages in an axial slit (11) of a first, upper prismatic body (12), and the plunger (8) acts on an end face (13) of a second, lower prismatic body (14). The device (1) for pressing in slot sealing pieces (12, 14) is arranged with lifting devices (22) on a support frame (23) which can be moved along the slot sealing pieces (12, 14) in the stator laminated core.

4 Claims, 6 Drawing Sheets

DEVICE FOR PRESSING SLOT SEALING PIECES FOR WINDING BARS INTO SLOTS OF AN IRON BODY OF AN ELECTRIC MACHINE

BACKGROUND OF THE INVENTION

1. Field of the Invention

The invention relates to a device for pressing in a slot sealing piece.

Such a device for pressing in a slot sealing piece is disclosed, for example, in CH 525 581.

2. Discussion of Background

Forces of alternating direction act on the conductor bars or coils arranged in the slots of electric machines under the interaction of the electric current flowing through the conductors and of the magnetic field in the air gap. It is therefore necessary to fix these conductors without play in the slots, which can be done by wedging under mechanical prestressing. The acting alternating forces are capable in some circumstances of exciting natural resonance in loose bars or coils. Even the slightest possibility of being able to move in the slots can cause the insulation of the coils or bars to be damaged. When the play is then enlarged, the destruction of the insulation progresses rapidly. For this reason, it is necessary for the bars or coils to be fixed in the slots laterally and at a level such that the acting alternating forces cannot cause loosening of the bars or coils. The force which is exerted on the bars or coils by the slot sealing pieces is in this case to be controlled at approximately the same level in the entire machine bore.

Arrangements for fixing the conductor bars or coils by means of slot sealing pieces in the slots of electric machines are known. In most arrangements of this type, the conductor bars or coils are pressed against the slot bottom by superimposed compensating trips and trapeze-shaped or swallow-tailed wedges. A device for fixing the trapeze-shaped or swallow-tailed edges is disclosed in CH 525 581 mentioned at the beginning. Here, a plunger presses against the end face of a lower wedge and presses the latter between compensating strips and an upper wedge which is supported against recesses in the laminated core of an electric machine. The abovementioned punch is connected to a pressure cylinder which is supported in radial air ducts of the electric machine by means of cams during the pressing-in operation of the wedges.

In this device, the undesired displacement of the wedges in the longitudinal direction of the machine has a disadvantageous effect for fixing the trapeze-shaped or swallow-tailed wedges. Furthermore, the radial cooling ducts in the stator laminated core of a rotating electric machine are not arranged over the entire length of the machine at the same spacing from the trapeze-shaped or swallow-tailed wedges. The cams arranged displaceably at the spacing on the pressure cylinder must thus be adapted to the different spacings between the cooling ducts and the wedges.

The insulation between individual segmental laminations from which the stator laminated core is constructed can be mechanically damaged when the cams move into the radial cooling ducts of the stator laminated core and by the subsequent exertion of force on core packets of the stator laminated core during the wedging operation. The consequence of the mechanical damage is then electrical damage to the laminated core owing to the occurrence of eddy currents during operation of the electric machine.

SUMMARY OF THE INVENTION

Accordingly, one object of this invention is the further development of a device for pressing in slot sealing pieces, termed a wedging device below, in the slots of a rotating electric machine to the effect that the wedging device is not supported during the pressing-in operation against the stator laminated core, and that the slot seals are wedged into the laminated core slot only at their axial position and are not displaced in the longitudinal direction of the machine.

Owing to the special design of the wedging device, the slot seals are fixed uniformly in a controlled fashion in the entire bore of the machine without the action of force by the wedging device on the stator laminated core. The slot seals are wedged at their axial position along the machine length, it being particularly advantageous when the force which is exerted on the bar insulation or core insulation by the wedging of the slot seals is selected to be greater than the vibratory force during operation of the machine, including an additional force which takes account of the aging of the winding parts.

The advantages of the invention are to be seen, inter alia, in that the overall height of the wedging device is designed such that it can be inserted into and guided through the air gap between the stator laminated core and rotor body of a rotating electric machine.

As a result, it is possible also to use the wedging device in machines which are shut down periodically for servicing purposes, their rotor remaining installed in the stator. A so-called rewedging of existing installations is particularly distinguished by high economic efficiency because the time consuming removal of the rotor is eliminated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. Not shown as part of the installation, for example, are the cable connections of a video device on display screens set up outside an electric machine. Furthermore, no pressure pipe connection to a force-generating device or a lifting device.

DESCRIPTION OF THE PREFERRED EMBODIMENTS

Figure 1:
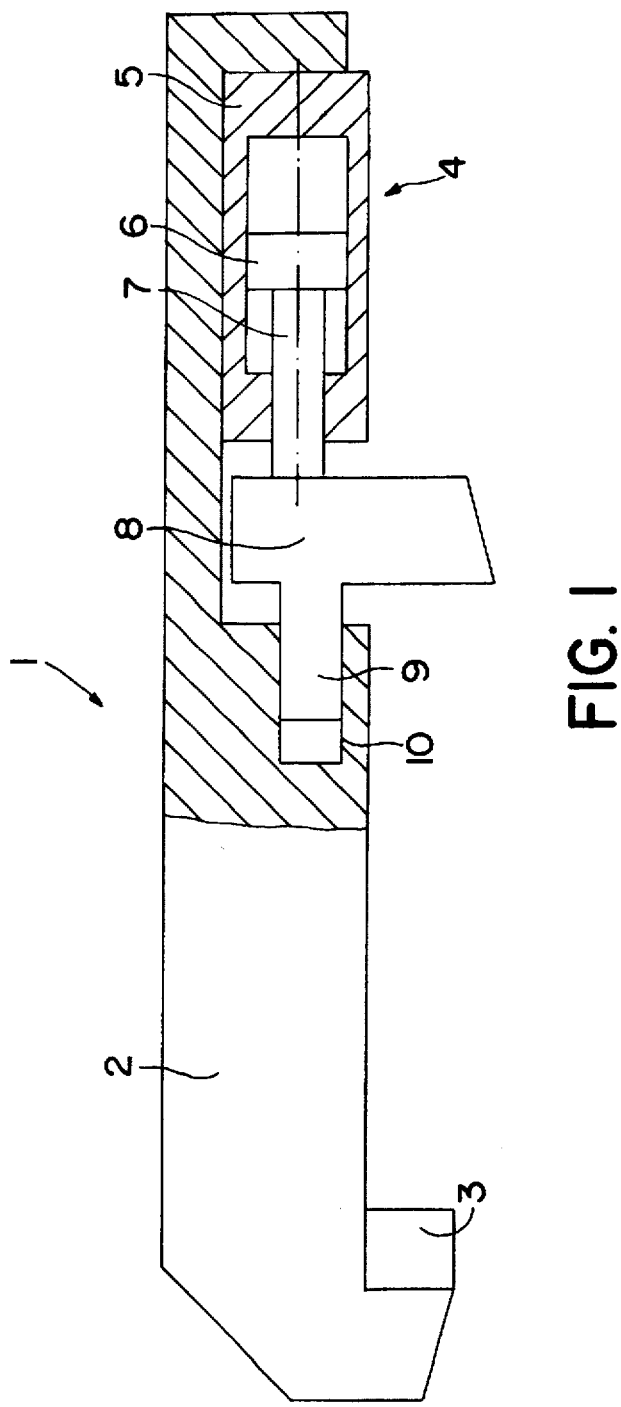
FIG. 1 shows a longitudinal section through a wedging device.

Referring now to the drawings, wherein like reference numerals designate identical or corresponding parts throughout the several views, the wedging device is designated in general by 1 in FIG. 1. This wedging device 1 essentially consists of a collet 2 with a cam 3 and a force-generating device 4. The force-generating device 4 comprises a pressure cylinder 5 in which a piston 6 is hydraulically operated. This piston 6 is connected via a linkage 7 to a plunger 8 which is guided by means of a guide pin 9 in a bore 10 of the collet 2.

Figure 2:
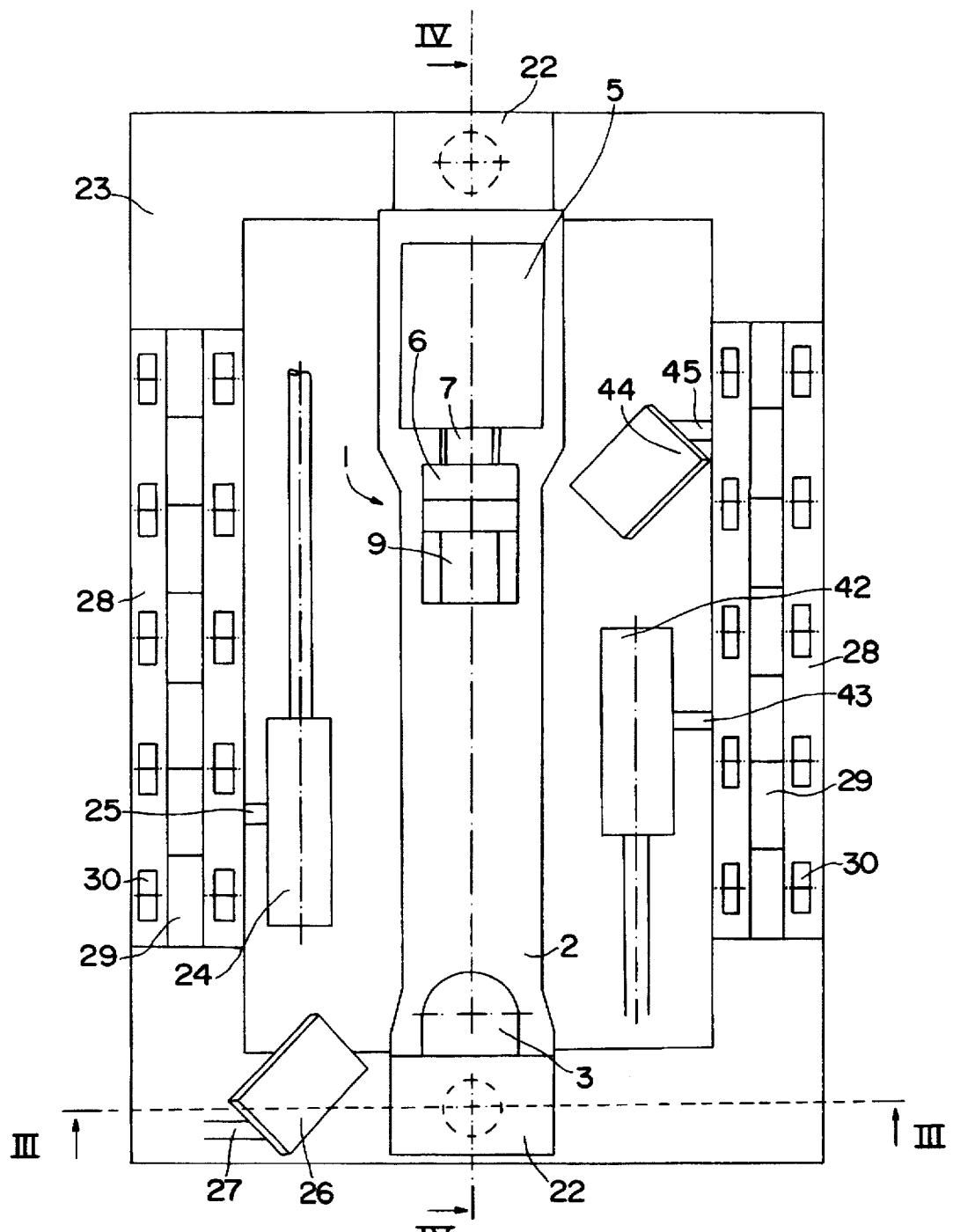
FIG. 2 shows a plan view of the wedging device which is fastened on a support frame.
Figure 3:
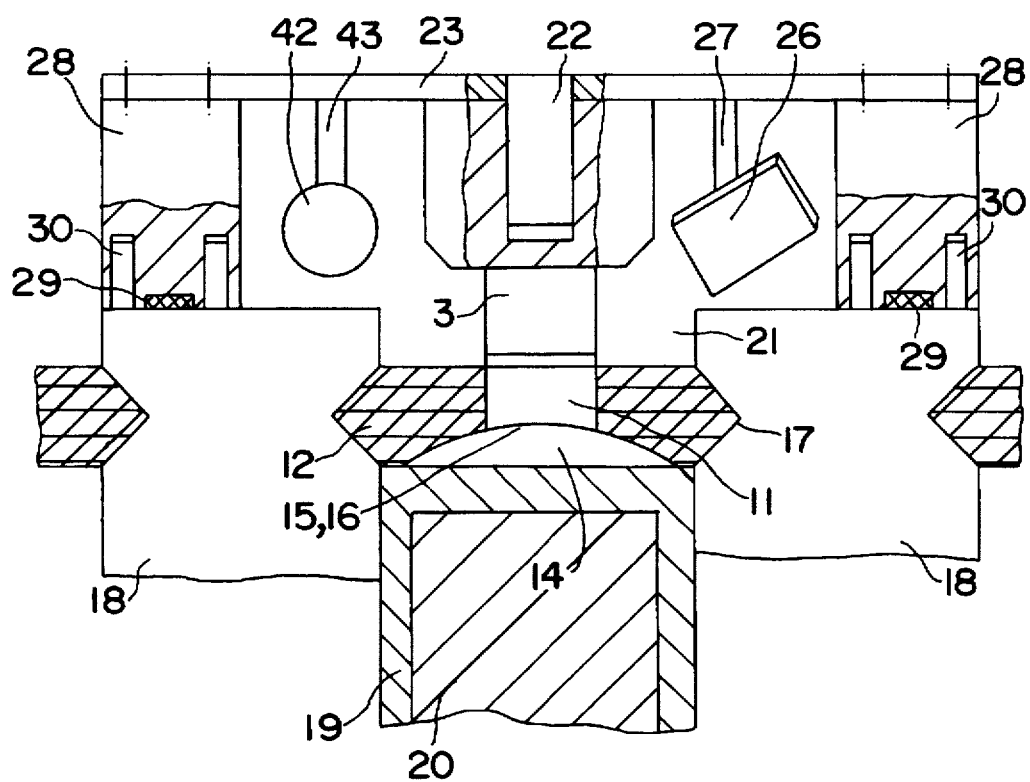
FIG. 3 shows a cross section through the wedging device along the line III—III in accordance with FIG. 2.

As FIG. 2 shows, the wedging device 1 is movably arranged with lifting devices 22 on a support frame 23. Also mounted on this support frame 23 is a video apparatus 24, 25, 26, 27 and 42, 43, 44, 45, and movable magnet supports 28. The video apparatus consists of two cameras 24, 42 with camera holders 25, 43 and two mirrors 26, 44 with mirror holders 27, 45. In this arrangement, the cameras 24 are installed with a mirror 26 on the support frame 23 such that the region around the cam 3 can be detected visually. The second camera 42 with a mirror 44 is mounted such that the region around the plunger 8 is detected. As FIG. 3 shows, permanent magnets 29 and rollers 30 are arranged on the movable magnet supports 28 (also FIG. 2), simply called magnet supports below, such that the support frame 23 can be moved on the rollers 30 along a stator laminated core 18 and in the process is held on the stator laminated core 18 by the magnetic force of the permanent magnets 29.

A conductor bar 20 with insulation 19 is inserted in a slot 21 of the stator laminated core 18, and the slot 21 is sealed by means of a tongue 14 and a swallow-tailed slot wedge 12 which is supported laterally in recesses 17 in the stator laminated core 18.

Figure 4:
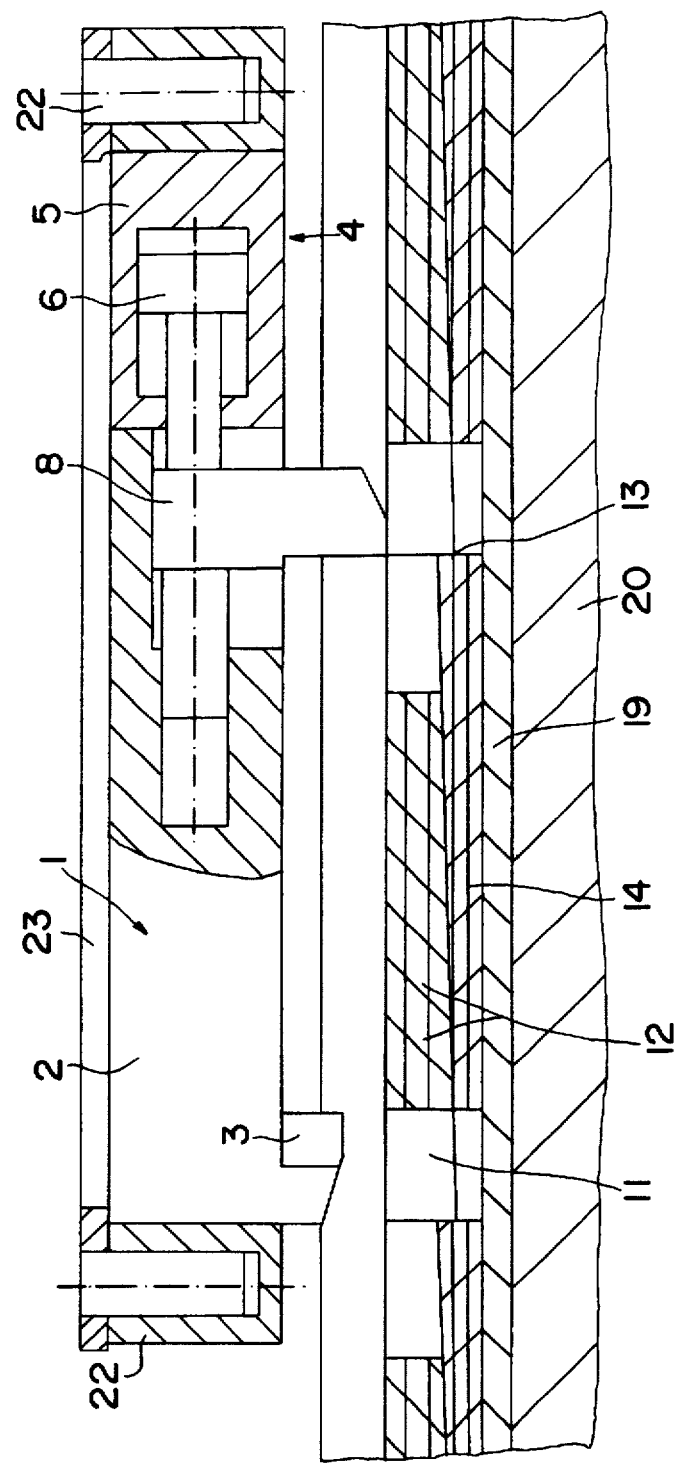
FIG. 4 shows a longitudinal section through the wedging device along the line IV—IV in accordance with FIG. 2.
Figure 5:
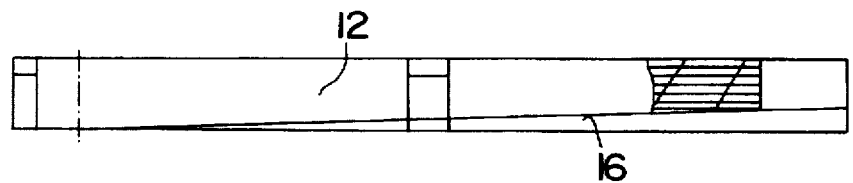
FIG. 5 shows a side view of an upper prismatic body of the slot sealing piece.
Figure 6:
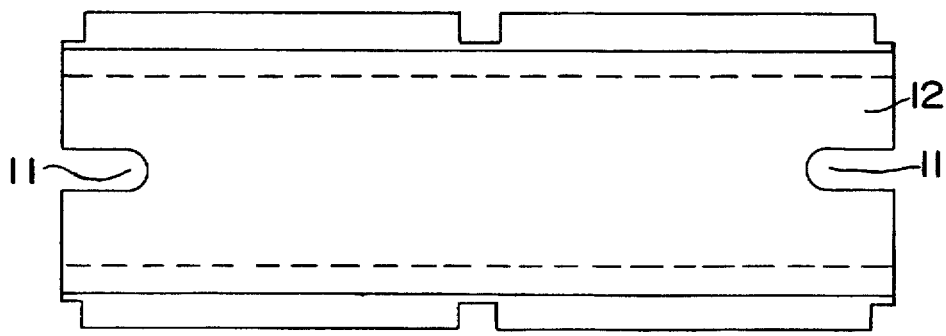
FIG. 6 shows a plan view of the upper prismatic body of the slot sealing piece.
Figure 7:
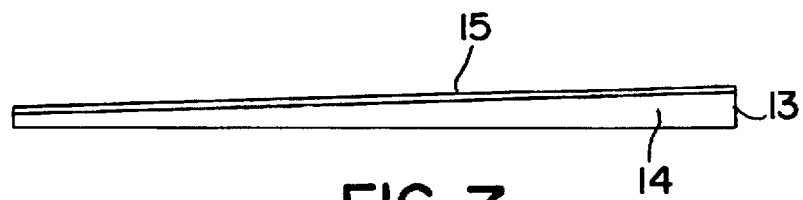
FIG. 7 shows a side view of a lower prismatic body of the slot sealing piece.

FIG. 4 shows the wedging device 1 positioned on a slot sealing piece 12, 14. These slot sealing pieces 12, 14 are described in more detail with the aid of FIGS. 5, 6 and 7. On its underside, the slot wedge 12 has a concave surface 16, and on the end faces it has axial slits 11. The tongue 14 has an upper convex surface 15 which in the assembled state faces the concave surface 16 of the slot wedge 12. The convex and concave surfaces 15, 16 are to be seen in FIG. 3.

The functioning of the wedging device 1 is explained with the aid of FIG. 4. If the collet 2 with the plunger 8 is positioned on a slot sealing piece 12, 14, the wedging device 1 is moved by the lifting device 22 in the direction of the slot sealing piece 12, 14, the cam 3 sliding in the axial slit 11 of the slot wedge 12, and the plunger 8 acting on an end face 13 of the tongue 14. In the case of hydraulic operation of the piston 6, the cam 3 and the plunger 8 more toward one another in the fashion of a screw clamp. In this process, the tongue 14 is pushed under the slot wedge 12, as a result of which a force acts from the tongue 14 onto the insulation 19 of the conductor bar 20 in the direction of the slot bottom. This force is selected to be greater than the vibratory force during operation of the machine including an additional force which takes account of the aging of the winding parts. Every slot seal 12, 14 can thus be fixed in a controlled fashion in a rotating electric machine.

Figure 8:
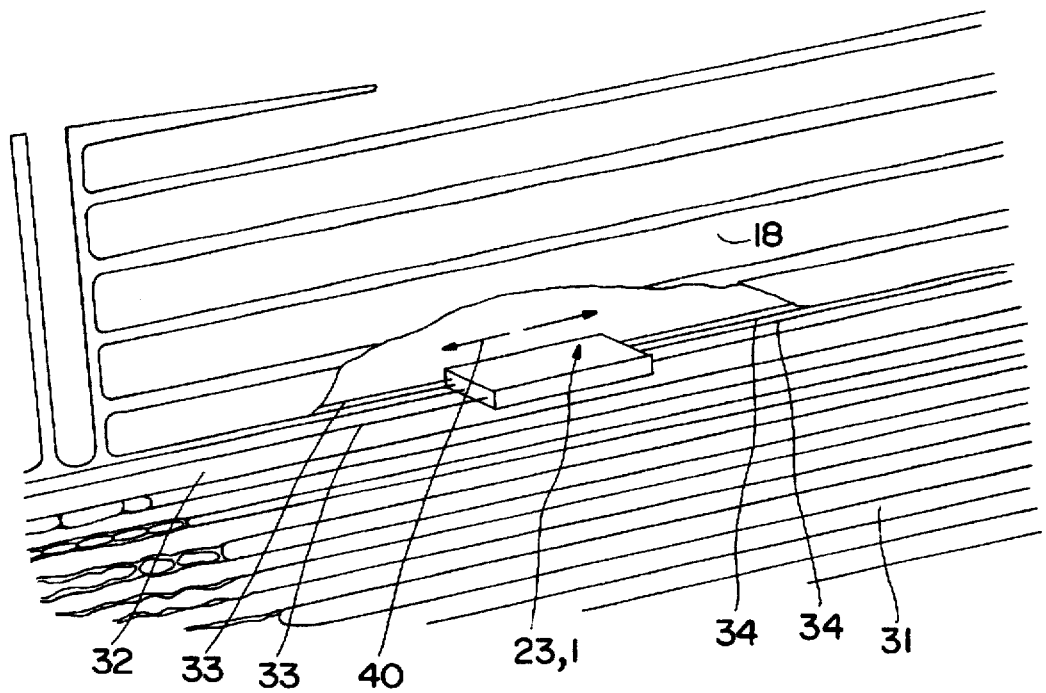
FIG. 8 shows a view of a wedging device which can be moved in the air gap of a turbo-generator by means of cable pulls.

FIG. 8 shows a section through the stator laminated core 18 and the rotor body 31 of an electric machine with an air gap 32 therebetween. Arranged in this air gap 32 on the support cables 33 is the support frame 23 with the wedging device 1 which can be moved by means of pull cables 34 in the longitudinal direction 40 of the machine. During movement of the support frame 23, the video apparatus 24, 25, 26, 27, as shown in FIG. 2, is used to position the wedging device 1 on slot seals 12, 14. For this reason, the video apparatus is connected outside the air gap 32 to display screens (not represented).

Figure 9:
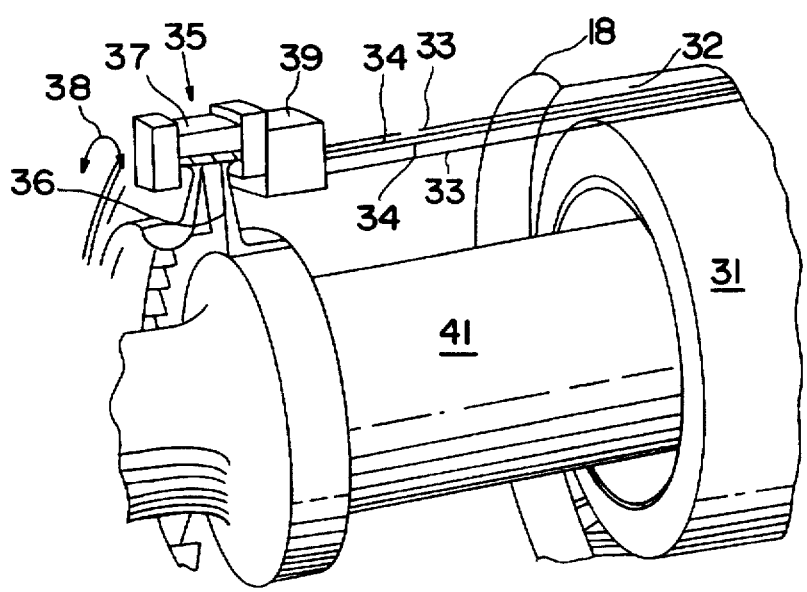
FIG. 9 shows a view of one of two supports which are fastened on machine fans.

The support cables 33 and the pull cables 34 each lead, as is represented in FIG. 9, on both sides outside the air gap 32 to a support 35. The supports 35 are arranged on one radial fan 36 and comprise a drive device 37 for moving 38 the support cables 33 in the circumferential direction, and a drive device 39 for moving 40 the wedging device 1 in the longitudinal direction of the machine.

The invention is not, of course, limited to the exemplary embodiment shown and described. Obviously, numerous modifications and variations for the present invention are possible in light of the above teachings. It is therefore to be understood that within the scope of the appended claims, the invention may be practiced otherwise than as specifically described herein.

Thus, for example, a force-generating device in the form of a gear rack or threaded rod which is connected non-positively to an electric drive is conceivable in the scope of the invention.

An arrangement of the supports 35 on another machine element, which is rotationally symmetrical with the shaft 41, or on the shaft itself, is likewise conceivable according to the invention.

What is claimed as new and desired to be secured by Letters Patent of the United States is:

1. A device for pressing slot sealing pieces for winding bars into slots of an iron body of an electric machine, the slot sealing pieces each including a first, upper prismatic body, the upper body having an underside with a lower surface that extends in an inclined fashion, and a second, lower prismatic body, the lower body having an upper surface, the upper surface facing the upper body, that extends in an inclined fashion parallel to an inclination of the lower surface of the upper body, the device comprising:

a wedging device including
        a plunger for acting on an end face of a second prismatic body of a slot sealing piece,
        a force-generating device, the force-generating device including a pressure cylinder with a fluid-operable piston, the piston having a linkage to which the plunger is connected, and
        a collet on which the force-generating device is arranged, the collet being adapted to engage with a cam on a first prismatic body of a slot sealing piece;
    a support frame, the support frame including one or more mounts, each of the one or more mounts including one or more rollers for permitting rolling movement of the support frame, and one or more permanent magnets for holding the support frame relative to an iron body of an electric machine, the electric machine having an iron body and a rotor body, the iron body and the rotor body defining an air gap, and slots into which the slot sealing piece is to be pressed;
    a lifting device, the lifting device connecting the wedging device to the frame; and
    a pulling device attached to the support frame for pulling the support frame and the wedging device connected to the support frame by the lifting device through the air gap.

2. The device claimed in claim 1, further comprising a video apparatus arranged on the support frame for positioning the device in the air gap.

3. The device as claimed in claim 2, wherein the video apparatus includes one or more cameras and one or more mirrors.

4. The device as claimed in claim 1, wherein the pulling device includes supports for supporting part of the pulling device, a part of the pulling device being of sufficient length to extend outside of the air gap of the electric machine.

* * * * *